Jan. 3, 1961
D. O. GALLENTINE
2,967,083
FIXED STYLI RECORDING HEAD
Filed Nov. 26, 1956
2 Sheets-Sheet 1
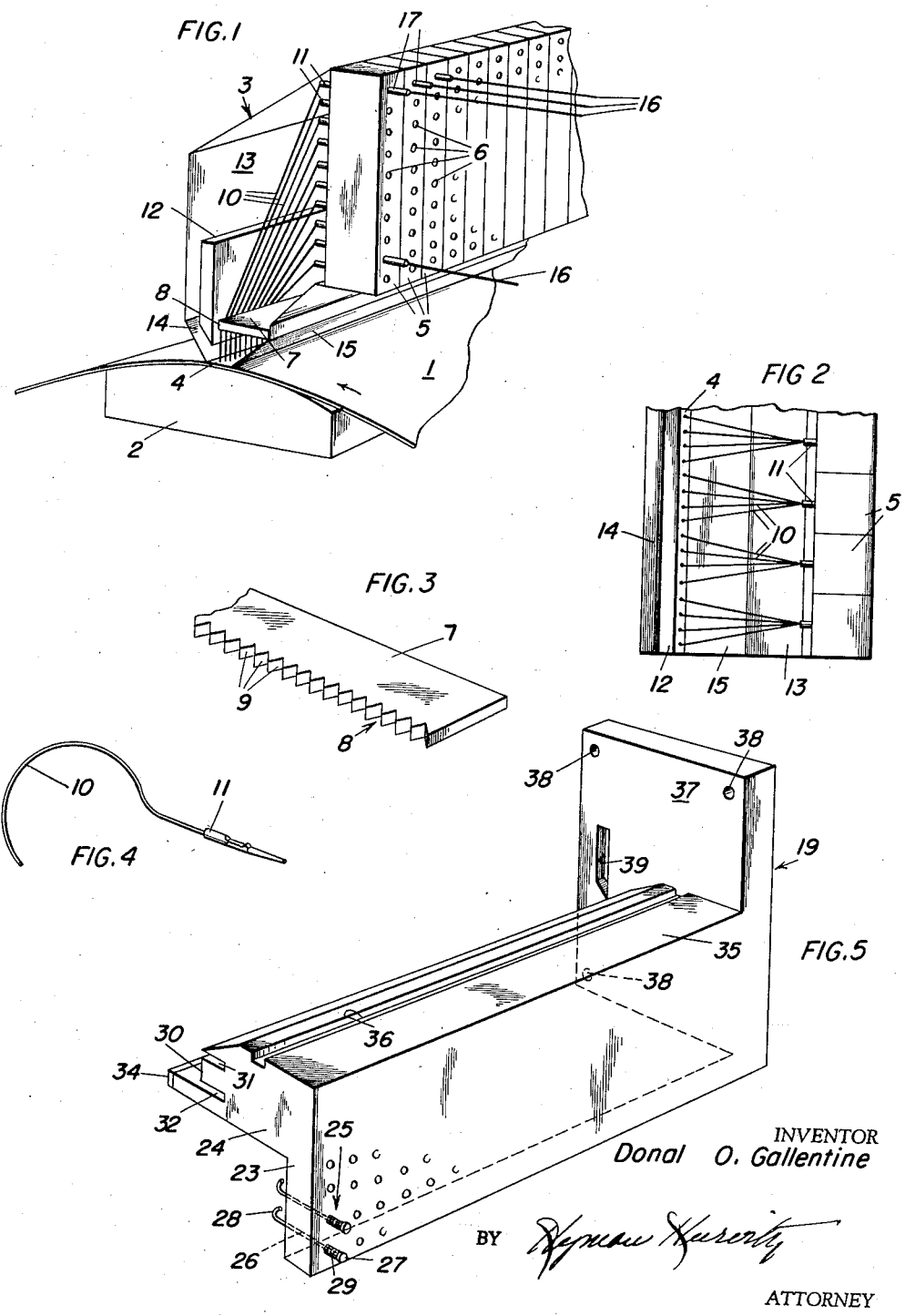
INVENTOR
Donal O. Gallentine
BY
ATTORNEY Jan. 3, 1961
D. O. GALLENTINE
2,967,083
FIXED STYLI RECORDING HEAD
Filed Nov. 26, 1956
2 Sheets-Sheet 2
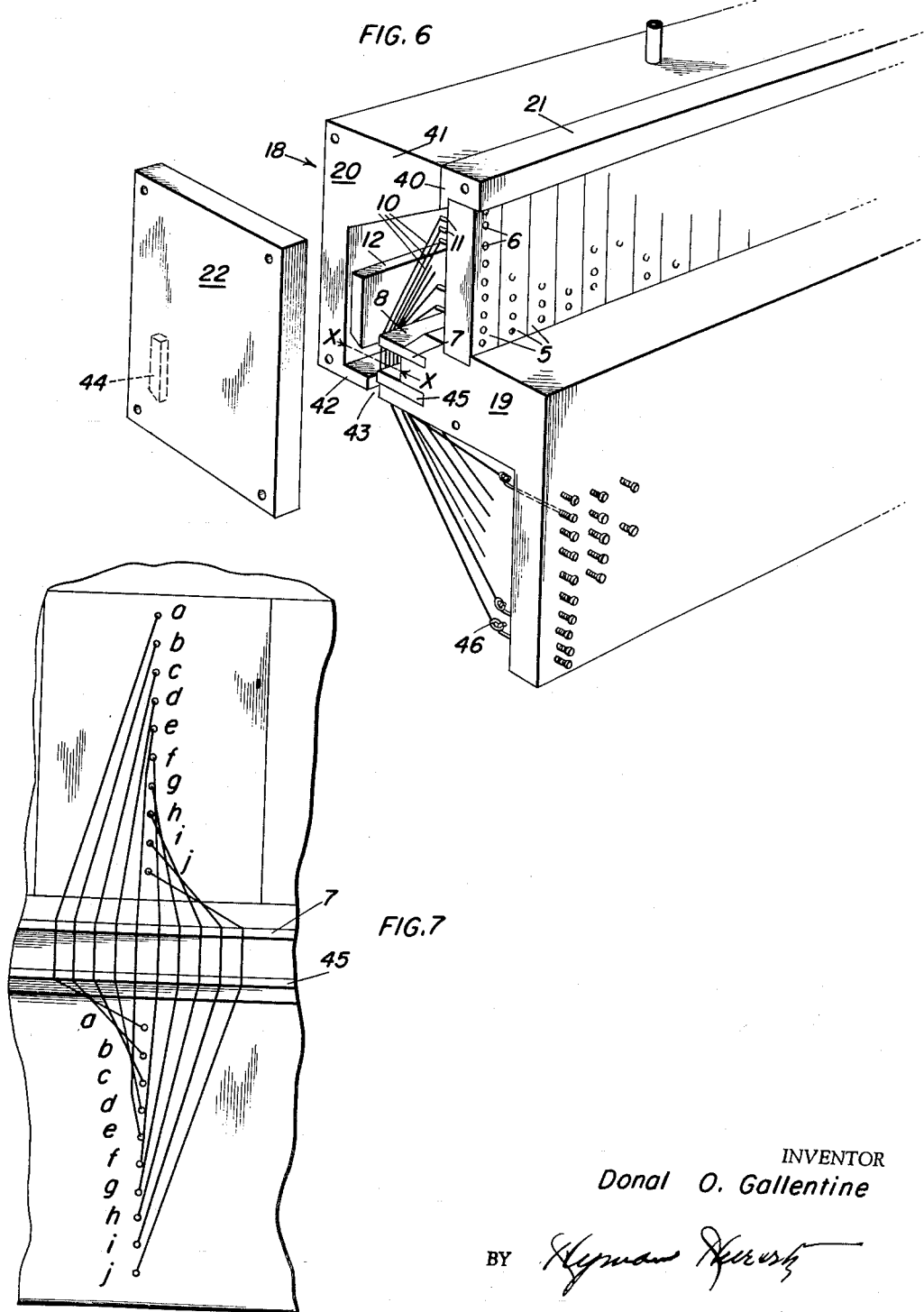
INVENTOR
Donal O. Gallentine
BY
ATTORNEY

United States Patent Office 2,967,083
Patented Jan. 3, 1961

2,967,083

FIXED STYLI RECORDING HEAD

Donal O. Gallentine, Eau Gallie, Fla., assignor to Radiation, Inc., Melbourne, Fla., a corporation of Florida Filed Nov. 26, 1956, Ser. No. 624,315

5 Claims. (Cl. 346—139)

The present invention relates generally to recording styli and more particularly to a multiple recording stylus assembly having a large number of closely spaced styli adapted for recording on an electro-responsive recording medium.

An electro-responsive recording medium such as Teledeltos paper is discolored by the passage of an electric current therethrough, the degree of discoloration depending upon the strength of the electric current and the length of time it is applied. The electric current may be applied to the recording medium by passing the medium between a conductive stylus engaging one surface of the paper and a conductive platen engaging the other surface of the paper. Discoloration of the paper is a local effect, that is, it occurs only in a small area adjacent the point of contact between the individual styli and the paper, and it is therefore possible to space closely a plurality of styli to provide a large number of adjacent indications in a relatively small area without fear that the indications will overlap and become indistinguishable. A number of different types of multiple stylus assemblies are described in the prior art for recording information in a plurality of closely spaced channels on a continuously moving strip of electro-sensitive paper. These assemblies employ a support for a large number of stylus wires, the support being suspended above the recording medium and the individual stylus wires extending from the support and into contact with the recording medium. Difficulty is experienced with such assemblies due to burning of the ends of the styli in contact with the paper which results from the relatively high contact resistance between the styli and the paper. Where the assembly is employed to record on relatively short rolls of paper, say of approximately one hundred feet, the problem of burning of the stylus ends is not serious. The ends of the styli are not burned sufficiently to effect appreciably the fidelity of recording and accumulation of the effects of burning may be prevented by cleaning the ends of the styli after each roll; cleaning being effected by rewinding the previously recorded roll on the supply spool while maintaining the styli in contact with the paper. Where continuous recordings are to be made on relatively long rolls of paper; such as rolls having a length of four to six hundred feet, the continuous burning of the tips over long intervals produces an excess residue before cleaning can be accomplished, often causing shorting between adjacent styli. A further effect of this continuous burning of the styli tips over long periods of time is that a carbon cinder is produced at the tip of the styli which increases the contact resistance between the styli and the paper thereby diminishing the intensity of the record obtainable with a given input voltage. The carbon cinder built up at the end of the tips of the styli can be removed by crushing with a tweezer. However, due to the fact that in most prior art styli assemblies, the stylus wires are unsupported adjacent the recording ends, the crushing of the carbon cinder with a tweezer often results in breakage or bending of the wires. The magnitude of the problem of shorting between stylus wires and the possibility of breaking a stylus wire when crushing the carbon cinder may be exemplified by considering a specific commercially available stylus assembly wherein each stylus wire is 0.005 inch in diameter and the spacing between the stylus is 0.013 inch.

It is, therefore, an object of the present invention to provide a multiple stylus assembly wherein the stylus wires are embedded in a plastic body, the recording end of the stylus wires terminating flush with an end of the plastic body so that removal of residue from the stylus tips may be accomplished by simply grinding the aforesaid surface of the plastic body.

Another object of the present invention is to provide a stylus assembly wherein build up of residue on the tips of the stylus wires is minimized and wherein the residue which does build up may be readily and easily removed.

It is yet another object of the present invention to provide a novel method of fabricating a multiple stylus assembly employing fine wires and extremely close spacing between adjacent stylus wires.

In accordance with the method of fabricating a multiple stylus assembly of the present invention, a plurality of terminal blocks are aligned adjacent one wall of a mold or alternatively and preferably may be clamped between two mold members to form a wall of the mold. Each of the terminal blocks includes a plurality of vertically aligned dual female connectors, that is, female connectors which may receive male connectors in both ends thereof.

In a specific embodiment of the invention each terminal block includes ten such female connectors and the number of terminal blocks employed is determined by the number of recording styli which are to be provided by the particular apparatus under consideration. Disposed below all of the terminal blocks and forwardly of one surface thereof are two vertically aligned spacer bars removably secured in the aforesaid mold. The spacer bars have vertically aligned notches for receiving individual stylus wires and the mold is provided with a vertical leg having spring biased members for receiving one end of each of the stylus wires during fabrication of the assembly. Each stylus wire is provided on one end with a male connector adapted to cooperate with the female connectors of the terminal block and is provided on the other end with a grommet or other suitable device for connection with a spring biased member. The male connector of each wire is inserted in a different female connector of the terminal block, the stylus wire extending from the male connector through aligned grooves in the spacer bars and thence to the spring biased member which maintains the stylus wires under tension during fabrication of the assembly. A heat conductive bar is disposed adjacent all of the stylus wires in the region of the upper spacer bar and the mold is then filled with a plastic material. After the plastic material has set, the assembly is cut on a horizontal line between the two spacer bars and as a result the ends of all of the stylus wires terminate flush with the end of the plastic body that is to contact the recording paper. The apparatus may then be removed from the mold and ground and trimmed to desired size.

The method of the present invention provides an economical and rapid method of assembling a multiple stylus assembly wherein the spacing between the stylus wires and the size of the stylus wires is quite small. Though the size of the wires and the spacing between centers may be quite small, the stylus wires may be 0.005 inch in diameter and the spacing between the stylus wires may be 0.018 inch, the fabrication problems are not great, since each wire is individually placed in the mold and positively retained therein while other wires are being attached. The terminal blocks may be commercially available AMP connectors and are only 3/16 of an inch thick, the male connectors cooperating with the female connectors of the terminal blocks also being commercially available AMP products.

The apparatus of the present invention overcomes to a considerable extent the difficulties encountered with the prior art stylus assembly, in that since the stylus wires are ground flush with and are embedded in the plastic body, they are held in close contact with the paper. In consequence, any residue resulting from burning is immediately wiped away by the following paper thereby eliminating any continuous build up of residue. An additional advantage achieved by embedding the stylus wires in plastic and terminating the wires flush with the surface of the plastic body is that damaged portions of the stylus wires or carbon cinders may be removed by simply grinding the surface of the plastic body; the fact that the stylus wires are relatively rigidly held in the plastic preventing them from bending or becoming broken during the grinding operation.

It is, therefore, another object of the present invention, to provide a multiple stylus assembly wherein the styli are embedded in a plastic body and terminated flush with a surface of the plastic body so that the stylus wires are wiped clean and burnished as a result of movement of the paper across the ends of the stylus wires.

It is still another object of the present invention to provide a method of fabricating a multiple stylus assembly requiring a minimum number of assembly operations.

The above and still further objects, features and advantages of the present invention will become apparent upon consideration of the following detailed description of one specific embodiment thereof, especially when taken in conjunction with the accompanying drawings, wherein:

Figure 1 of the accompanying drawings illustrates a recording system employing the multiple stylus assembly of the present invention wherein the stylus assembly is diagrammatically illustrated;

Figure 2 is a bottom plan view of the apparatus of Figure 1;

Figure 3 illustrates a form of spacer bar which may be employed in the apparatus of and with the method of fabrication of the present invention;

Figure 4 is an illustration of a stylus wire with a male pin connector fastened to one end thereof;

Figure 5 is a plan view of one member of the mold employed to fabricate the apparatus of the present invention;

Figure 6 is a plan view of the assembly mold employed to fabricate the apparatus of the present invention and of the various elements of the assembly appropriately situated in the mold; and Figure 7 is a front view of the wiring plan of the stylus assembly of the present invention.

Referring more specifically to the apparatus of Figures 1 and 2 of the accompanying drawings, recording paper 1 is fed at a uniform rate from a supply reel (not illustrated) over an electrically conductive platen 2 to a take up reel (not illustrated). Suitably supported above the platen 2 is a stylus assembly 3 having a lower surface 4 extending across the width of the paper 1 perpendicular to its direction of movement. The stylus assembly 3 includes a plurality of vertically extending narrow terminal blocks 5 arranged side by side to provide a vertical wall of the assembly. Each terminal block 5 has a plurality of dual female connectors 6 arranged in a vertical row and extending through the terminal block so as to be capable of receiving male connectors in both ends concurrently.

A flat, longitudinally extending spacer bar 7 is disposed below and to the left and extends parallel to the row of terminal blocks 5, as viewed in Figure 1. The spacer bar 7 has a narrow vertical front or left hand edge 8 carrying a plurality of equally spaced triangular notches 9 (see Figure 3), each for receiving a different stylus wire. Consequently, the number of notches 9 must be equal to the number of stylus wires provided by the assembly 3.

A plurality of stylus wires 10 (see Figure 4) are each provided on one end with a pin type electrical connector 11 crimped into engagement with the wire 10. The pin terminal 11 of each wire is disposed in a separate female terminal 6 and the stylus wire 10 extends from the end of the pin 11 downwardly and to the left as viewed in Figure 1 of the accompanying drawings, passes through one of the triangular notches 9 in the spacer bar 7 and terminates vertically below the bar 7 flush with the horizontal surface 4 of the stylus assembly 3. Disposed forwardly, that is, to the left of the spacer bar 7 is a longitudinally extending bar 12 of heat conductive material, such as copper. The bar 12 extends from a region near the recording surface 4 to a position well above the spacer bar 7 and provides a heat sink for rapidly removing heat from the recording ends of the stylus wires.

A plastic body 13 of electrically non-conductive material is molded about the stylus wires 10, the spacer bar 7 and the heat conductive bar 12 and adheres to the front or left surfaces of the terminal blocks 5 so as to securely retain all elements of the assembly 3 positively positioned with respect to one another and therefore provide a physically united assembly. The plastic material is illustrated as being transparent in Figure 1 of the accompanying drawings so that the various elements of the assembly 3 may be observed. The lower portions of the front and rear edges of the plastic body 13 designated by reference numerals 14 and 15, respectively, are tapered inwardly of the body so as to provide a recording surface 4 having a predetermined desired length parallel to the direction of movement of the paper 1.

As previously indicated the stylus assembly 3 is positioned above and in contact with the recording paper 1 which is pressed between the platen 2 and the recording surface 4 of the assembly 3. The pressure between the recording surface 4 and consequently the ends of the stylus wires 10 must be maintained within predetermined limits in order to achieve adequate recording currents. The proper pressure may be obtained in a number of ways known to the art, such as, holding the paper against the surface 4 by means of a vacuum transmitted to the paper 1 through holes in the assembly 3 which terminate at the surface 4, covering a spring biased platen 2 with sponge rubber having a layer of metal foil or fine metal cloth disposed above the rubber and in contact with the paper, or employing precision ground recording and platen surfaces.

In consequence of the wires 10 terminating flush with the surface 4 of assembly 3 an end of each of the stylus wires 10 is pressed into engagement with a different region of the paper 1. Each of the wires 10 is connected in circuit with a different source of information signals (not illustrated) by means of input leads 16 each having a pin connector 17 secured to one end thereof, each pin connector being inserted in a different one of the female connectors 6. When it is desired to record information electrical signals are applied to the input leads 16. The paper 1 may be a voltage sensitive or a current sensitive recording paper but for the purposes of illustration the invention is described as employed with current sensitive paper such as Teledeltos paper. Teledeltos paper is an electrically conductive paper which is discolored by the passage of an electric current therethrough, the degree of discoloration depending upon the magnitude of the current passed. The current passes through each series circuit comprising a stylus 10, a small region of the paper 1 adjacent its stylus and the platen 2 actuates the paper to provide a permanent record, the record of the current applied to each stylus appearing in a different channel extending parallel to the direction of movement of the paper 1.

In order to insure faithful reproduction of the information applied to each stylus 10, the stylus wires 10 must be prevented from shifting laterally into contact with one another, residue resulting from burning of the paper must be removed from the ends of the styli, the rate of formation of carbon cinders on the ends of the styli must be maintained low and all of the stylus wires must be maintained in contact with the paper 1. In accordance with the present invention the objects are achieved by embedding the stylus wires 10 in a plastic body, terminating the wires 10 flush with the recording surface 4 and providing a heat sink 12. The solid plastic body prevents movement of the wires 10 transverse of the paper and consequently prevents the wires 10 from shifting into contact with one another. The residue resulting from burning of the paper is removed in consequence of the wiping and burnishing action of the paper on the ends of the styli as it moves over the surface 4; this effect being possible due to the fact that the styli are held in contact with the paper 1 by the solid plastic body 13. The rate of formation of a carbon cinder on the ends of the styli is minimized as a result of two distinct features of the invention. The termination of the styli 10 flush with the surface 4 insures a good electrical contact between the paper 1 and styli 10 so that the contact resistance is relatively small and relatively little heat is generated at the point of contact and a large portion of the heat which is generated is rapidly conducted away by the heat sink 12. The burning of the ends of the stylus wires 10 cannot be completely eliminated and therefore after a long period of time steps must be taken to remove the burned portions of the wires 10. This may be quickly and easily accomplished with the apparatus of the present invention by merely grinding the surface 4, the grinding operation insuring proper alignment of the ends of the wires since all wires 10 terminate flush with surface 4. Further the fact that the wires 10 are embedded in the plastic body 13 prevents breakage of the wires 10 during grinding.

The precise form of the assembly 3 illustrated in Figure 1 is merely exemplary and various changes in construction may be made without departing from the true spirit of the invention. More specifically the individual terminal blocks may be replaced by a single terminal block and the notched spacer bar may be replaced by an apertured spacer bar having one aperture for each stylus wire. Also, the outer shape of the assembly 3 may be considerably varied so long as a surface 4 of proper width and length is obtainable.

In a specific form of the invention the displacement between each notch 9 of the spacer bar 7 is 0.018 inch, the diameter of the stylus wires is 0.005 inch and the connector pins 11 and terminal blocks 5 are standard AMP products, each block 5 having ten female terminals 6 and being 3/16 of an inch wide. In consequence, a stylus assembly 3 having six hundred and forty (640) stylus wires 10 may be provided which is only twelve (12) inches wide, the sixty-four terminal blocks 5 requiring 11.96 inches and the spacer bar 7 being approximately the same length.

Proceeding now to a description of the method of fabricating the stylus assembly 3 of the present invention reference is made to Figures 5–7 of the accompanying drawings. Inasmuch as the stylus assembly employs a molded plastic body having the stylus wires 10, the spacer bar 7 and heat sink 12 embedded therein a mold must be provided in which the various elements of the apparatus may be quickly and easily assembled and thereafter embedded in the plastic.

Referring initially to Figure 6 of the accompanying drawings, a mold 18 consists of an inverted generally L-shaped member 19, a generally U-shaped member 20, a partial top wall member 21 and a side plate 22. The inverted L-shaped member 19 has a vertical leg portion 23 (see Figure 5) terminating in a horizontal base 24. The leg portion 23 of member 19 has a plurality of spring biased members 25 arranged in horizontal rows and vertical columns below the base 24, each of the members 25 being adapted to apply a tension load to a different stylus wire 10 during fabrication of the assembly. Each of the members 25 includes a rod 26 slidable in and extending through the leg 23 from left to right as viewed in Figure 5, the rod 26 terminating in a flat disc 27 on the right side of leg 23 and a hook 28 on the left side of leg 23. A compression spring 29 is disposed about each rod 26 and is positioned between the right side of the leg 23 and the disc 27 so that when an end of a stylus wire 10 is engaged by the hook 28, the wire 10 is placed under tension by the spring 29.

The base 24 of the mold member 19 extends horizontally from the leg 23 to the left as viewed in Figure 5 terminating in a vertical wall 30 having two longitudinally extending vertically spaced and parallel upper and lower grooves 31 and 32, respectively. Below the groove 32 and defining the lower surface thereof is a flat member 33 which extends to the left of the vertical wall 30 and has secured to its vertical edge a longitudinally extending plastic strip 34. Above the groove 31 the base 24 slopes upwardly and to the right to a top wall 35 of the base 24. A groove 36 extends longitudinally of the top wall 35 and terminates in an end wall 37 of the mold 18. The end wall 37 is generally rectangular, rising above the base 34 of the mold member 19 and extending to the left of the plastic strip 34. The end wall 37 has holes 38 at its three corners for receiving bolts adapted to secure the mold members 20 and 21 to the wall 37. The wall 37 is further provided with a recess 39 adapted to receive one end of the heat conductive bar 12 during fabricatiton of the assembly 3.

The mold member 21 is a flat plate having a longitudinally extending section 40 extending downwardly for a short distance from the left edge of the plate.

The mold member 20 is generally U-shaped having an upper leg 41 adapted to engage the vertical left edge of the member 21 and having a bottom leg 42. The bottom leg 42 has a plastic strip 43 extending along its vertical edge which is adapted to engage the plastic strip 34 secured to the base 24 of mold member 19.

The mold member 22 is a flat plate employed to close the end of the mold 18 and has a recess 44 for receiving the other end of the heat conductive bar 12 during fabrication of the assembly 3.

Proceeding to a description of the method of fabricating the stylus assembly 3 of the present invention, the mold member 21 is bolted to the end wall 37, the right edge of the segment 40 of the member 21 being vertically aligned with the left edge of the groove 36 in the top wall 35 of the base 24. A plurality of terminal blocks 5 are inserted between the mold members 19 and 21 with their lower ends positioned in the groove 36 and their upper ends being engaged by the segment 40 of mold member 21. A sufficient number of terminal blocks 5 are employed to fill completely the groove 36 and in consequence the terminal blocks constitute a portion of the right wall of the mold as viewed in Figure 6. It is not intended to limit the invention to the utilization of a mold where the blocks 5 form one wall thereof, since a wall may be readily provided for the mold 18.

After the terminal blocks 5 have been positioned in the mold 18, spacer bar 7 is inserted in the groove 31 and a second spacer bar 45, identical to spacer bar 7, is inserted in the groove 32. The spacer bars 7 and 45 extend outwardly from the grooves 31 and 32, the bottom of the grooves 9 in their left hand edges being vertically aligned with the left hand edge of the plastic strip 34.

Equal lengths of tungsten or other suitable wire are cut and the wires are provided on one end with a pin or other suitable male connector 11 and on the other end with a grommet 46. The pin connector 11 of each wire is then inserted in a different female terminal 6 of the terminal blocks 5, the wire is passed through a pair of vertically aligned notches 9 in the spacer bars 7 and 45 and the grommet 46 is placed over a hook 28 of one of the spring biased members 25, the wire 10 thus being maintained under tension. In order to be able to employ equal length stylus wires for the entire assembly each wire 10 extends from a terminal 6 to a member 25 having complementary positions on opposite sides of the base 24 of the mold member 19. Such a wiring arrangement is specifically illustrated in Figure 7 of the accompanying drawings wherein each wire 10 extends from one of the terminals *a*—*j* above the base 24 to members *a'*—*j'* having a complementary position below the base 24 to the position of the terminal 6 above the base. Actually, the total length of the path of the wires 10 differ due to longitudinal displacement of the wires. However, since the longitudinal displacement between adjacent wires is only 0.018 inch in a practical embodiment of the invention, the difference in path lengths resulting from longitudinal displacement is very small and may be disregarded.

Referring again to Figure 6 of the accompanying drawings, the wires 10 coupled to the forwardmost terminal block 5 pass through the forwardmost notches 9 in the spacer bars 7 and 45 and are attached to the spring biased members 25 in the forwardmost column along the leg 23 of mold member 19, the columns of members 25 being aligned with the columns of terminals 6 in each terminal block 5. After all of the wires 10 have been properly positioned, one end of the heat conductive bar 12 is inserted in the recess 39 in wall 37 and the plate 22 is secured to the forward end of mold members 19 and 21 as viewed in Figure 6, the other end of bar 12 being seated in recess 44 in member 22. Thereafter, the U-shaped mold member 20 is secured between end wall 37 and plate 22 to complete assembly of the mold 18. The wires 10 are pressed between the plastic strips 34 and 43, the plastic being deformable and therefore providing a liquid tight seal about the wires.

A suitable thermosetting resin is then added to the mold 18 through a pipe 47 and the plastic is allowed to harden. The mold member 20 is then removed and the product within the mold 18 is cut along a horizontal line *x*—*x* between the spacer bars 7 and 45. The mold members 21 and 22 are removed and the assembly 3 is withdrawn from the mold member 19. The left edge of the spacer bar 7 is trimmed flush with the vertical wall of the assembly formed by the surface 30 of the mold member 1 and the ends of the heat sink 12 which were seated in the recesses 39 and 44 are trimmed flush with the end walls of the assembly 3. The surfaces 14 and 15 (see Figure 1) are then ground to provide a recording surface 4 of the proper length to complete fabrication of the assembly.

The specific mold structure recited has been found to be convenient for utilization in the fabrication of the assembly 3 but it is not intended to restrict the method of the invention to the specific mold illustrated. A single mold may be employed regardless of the number of stylus wires per assembly, since if a particular size assembly does not require a number of terminal blocks 5 sufficient to fill the groove 36 in mold member 19 a spacer may be inserted in the groove to complete the mold wall defined by the terminal blocks, and after removal of the assembly 3 from the mold, the excess of the heat sink 12, spacer bar 7 and plastic 13 may be trimmed away.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A stylus assembly comprising terminal means having a plurality of electrical terminals secured therein, a spacer bar displaced from all of said terminals in at least a first coordinate direction, said spacer bar having a surface displaced from said terminal means in a second coordinate direction, a plurality of thin, flexible stylus wires each having a terminal end and a recording end, a plurality of receiving means aligned along said surface of said spacer bar each for individually receiving a different one of said stylus wires, means for securing said terminal end of each of said stylus wires to a different one of said terminals, each of said stylus wires extending from its associated terminal through said receiving means to a predetermined location remote from said spacer bar and said terminal means, and a solid body of insulating material abutting said terminal means and substantially completely enclosing said stylus wires and said spacer bar, said body having a surface adapted to engage a recording medium, said recording ends of said stylus wires terminating flush with said surface of said body and being aligned along a third coordinate direction.

2. A stylus assembly comprising terminal means having a plurality of electrical terminals secured therein, a spacer bar displaced from all of said terminals in at least a first coordinate direction, said spacer bar having a surface displaced from said terminal means in a second coordinate direction, a plurality of thin, flexible stylus wires each having a terminal end and a recording end, a plurality of receiving means aligned along said surface of said spacer bar each for individually receiving a different one of said stylus wires, means for securing said terminal end of each of said stylus wires to a different one of said terminals, each of said stylus wires extending from its associated terminal through said receiving means to a predetermined location remote from said spacer bar and said terminal means and a solid plastic body abutting said terminal means and substantially completely enclosing said stylus wires and said spacer bar, said plastic body having a surface adapted to engage a recording medium, said surface of said plastic body terminating in a plane common to all of the predetermined locations at which said stylus wires terminate, said stylus wires being aligned along a third coordinate direction.

3. A stylus assembly comprising terminal means having a plurality of terminals secured therein, said terminals being arranged in rows and columns extending respectively in first and second coordinate directions, a plurality of stylus wires each having a terminal end and a recording end, a spacer bar displaced from said terminal member in the second and in a third coordinate direction, said spacer bar having a surface remote from said terminal member lying in the plane of the first and second coordinate directions, said surface having a plurality of notches extending in a row in the first coordinate direction, means for securing said terminal end of each of said stylus wires to a different one of said terminals, each of said stylus wires extending from its associated terminal through a different one of said notches of said spacer bar to a point displaced from said spacer bar in said second coordinate direction, and a solid plastic body surrounding said stylus wires and said spacer bar, said recording end of said stylus wires being flush with an end of said plastic body.

4. The combination in accordance with claim 3, further comprising a heat conductive bar positioned adjacent said recording ends of said stylus wires and enclosed within said plastic body.

5. A stylus assembly comprising terminal means having a plurality of electrical terminals secured therein, a spacer bar displaced from all of said terminals in at least a first coordinate direction, said spacer bar having a surface displaced from said terminals means in a second coordinate direction, a plurality of thin flexible stylus wires each having a terminal end and a recording end, a plurality of receiving means aligned along said surface of said spacer bar each for individually receiving a different one of said stylus wires, means for securing said terminal end of each of said stylus wires to a different one of said terminals, each of said stylus wires extending under tension, from its associated terminal through said receiving means to a predetermined location remote from said spacer bar and said terminal means, and a solid body of insulating material abutting said terminal means and substantially completely enclosing said stylus wires and said spacer bar, said body having a surface adapted to engage a recording medium, said recording ends of said stylus wires terminating flush with said surface of said body and being aligned along a third coordinate direction.

References Cited in the file of this patent

UNITED STATES PATENTS

| | | |
|---|---|---|
| 456,611 | Balsley | July 28, 1891 |
| 522,664 | Kleinsteuber et al. | July 10, 1894 |
| 2,334,534 | Ballweg | Nov. 16, 1943 |
| 2,402,338 | Morehead | June 18, 1946 |
| 2,486,985 | Ruderfer | Nov. 1, 1949 |
| 2,561,345 | Deloraine | July 24, 1951 |
| 2,568,771 | Smith | Sept. 25, 1951 |
| 2,627,448 | Horton | Feb. 3, 1953 |
| 2,685,107 | Schultz | Aug. 3, 1954 |
| 2,719,775 | Erving | Oct. 4, 1955 |
| 2,739,030 | Kruse | Mar. 20, 1956 |
| 2,743,507 | Kornei | May 1, 1956 |
| 2,746,130 | Davis | May 22, 1956 |
| 2,777,745 | McNaney | Jan. 15, 1957 |
| 2,796,559 | Feucht | June 18, 1957 |

FOREIGN PATENTS

| | | |
|---|---|---|
| 784,450 | Great Britain | Oct. 9, 1957 |